United States Patent [19]
Creighton et al.

[11] 3,788,003
[45] Jan. 29, 1974

[54] SEEDLING CONTAINER

[75] Inventors: Stephen Mark Creighton; David Lawrence Mitchell; William Chee Kay, all of Edmonton, Alberta, Canada

[73] Assignee: Research Council of Alberta, Edmondson, Alberta, Canada

[22] Filed: July 19, 1971

[21] Appl. No.: 163,810

[52] U.S. Cl. .................................... 47/56, 47/37
[51] Int. Cl. .............................................. A01c 1/04
[58] Field of Search .................................. 47/37, 56

[56] References Cited
UNITED STATES PATENTS

| | | | |
|---|---|---|---|
| 1,959,139 | 5/1934 | Otwell | 47/37 |
| 2,785,969 | 3/1957 | Clawson | 47/37 X |
| 3,172,234 | 3/1965 | Eavis | 47/56 X |
| 3,362,106 | 1/1968 | Goldring | 47/56 |
| 3,456,386 | 7/1969 | Holden | 47/56 |

FOREIGN PATENTS OR APPLICATIONS 760,162   6/1967   Canada ........................... 47/34.13

*Primary Examiner*—Edgar S. Burr
*Attorney, Agent, or Firm*—Saucier, Jones, Black, Gain, Stratton and Laycraft

[57] ABSTRACT

Peat and water are mixed to form a thick paste which is extruded into a plastic film casing. The casing and filling are sliced into short, open-ended units. The units provide containers in which seedlings can be grown. When the seedlings are to be planted, the casing is perforated or shredded with a knife and the peat plug and seedling root ball buried together.

2 Claims, 7 Drawing Figures

SEEDLING CONTAINER

BACKGROUND OF THE INVENTION

This invention pertains to a peat plug, to a seedling container unit incorporating the plug, and to a method for manufacturing the seedling container units. Application is found for the container units in the propagation of tree seedlings for reforestation projects, and in other areas of horticulture.

For many decades, seedling stock for reforestation has largely been provided using the "bare root" method. This involves planting seeds in outdoor seed beds and rearing the seedlings there for two or three years. When properly matured, the seedlings are lifted; this is usually done in the late fall when the plants are dormant. The "bare root" seedlings are then usually held in cold storage until spring, when they are outplanted in the forest.

This technique has several disadvantages. For example, the rearing period is long and therefore expensive. A substantial number of the plants die while in the seed beds or when their roots are exposed to air during the lifting and storing operations. In addition, the planting season is very short and the whole process is labor intensive.

Over the past decade, nursery practice has changed and in many cases seedlings are now grown in small individual container units under controlled conditions in a greenhouse or in a hothouse in milder climates. After 8 to 20 weeks of growth, the seedlings are taken to the forest and outplanted.

One important advantage of this latter practice is that it lends itself to mechanization, with attendant savings in labor and time. Since many millions of these seedlings must be planted in North America each year, any improvement along this line is useful. In addition, the time factor involved in raising the seedlings is greatly reduced. The seedlings are grown under ideal conditions, and they are planted with their rooting medium attached to provide a water-absorptive and retentive reservoir.

The prior art container units consist of two parts: the outer container, and the rooting medium, usually peat, with which it is filled. One such outer container comprises a styrofoam plastic block having a number of spaced cavities formed therein. The block has the appearance of a single-layer honeycomb. Each cavity has a depth of about 4 ½ inches and a diameter of 1 inch; it is filled with 2 – 3 cubic inches of loose, dry, hand-packed peat. An opening is provided at the base of each cavity to allow for the drainage of excess water. Another known container comprises a cylinder of stiff paper or plastic which is slit longitudinally and hand-packed with peat. In this latter case, the containers are separate; in the former case, they are joined together to form the block. In both cases, the outer container functions, at the greenhouse stage, to retain moisture and prevent intertwining of the root systems of adjacent plants. The container is left on while the seedlings are transported to the field and serves to hold the root balls intact. In the case of the block, the seedling and root ball are extracted together from the container and planted. In the case of the tubeling, the container is left in place around the root ball when it is planted.

It will be noted that the rooting medium commonly used in seedling container units is peat; since the present invention is partly concerned with controlling the properties of peat, it is useful at this point to describe the material in some detail.

Peat is a soil containing at least 50 percent by weight organic matter. The organic material is the decomposition product of various types of plants. Peat originating from sphagnum moss has long been preferred for horticultural purposes because of its exceptional water-absorptive and retentive properties.

Peats are classified according to their state of decomposition. A relatively undecomposed peat is comprised of the intact skeletons of leaves and stems. This material is fibrous in form and, in the aggregate, provides a loose, porous structure. On the other hand, peat in an advanced state of decomposition is amorphous and colloidal in structure. The former is capable of absorbing and holding large amounts of water while the latter is not. The Von Post scale is commonly used in the art to indicate the state of decomposition — it runs from 1 to 10. Most peats used for horticultural purposes have a Von Post rank of 1 or 2.

Table 1 illustrates the differences in water-absorbing capacity and particle size which are present in two peats at different stages of decomposition:

TABLE I

|  | Von Post rank | % absorptive value/100 grams dry peat | Fibre Size (mm) >2.0 | 2 –.1 | <.1 |
|---|---|---|---|---|---|
| sphagnum | 1 | 1935 | 57.4 | 22.3 | 20.3 |
| sphagnum | 5 | 373 | 5.7 | 35.8 | 58.5 |

Peats normally contain soluble ionic salts, such as alkali metal salts. Since these salts are usually harmful to plant growth, it is prudent to choose peat having a low extractive salt content for seedling containers.

Peat is characterized by porosity and permeability. In other words, it has void spaces which are capable of holding water, and many of these voids are interconnected so that moisture can readily move through the mass. The capacity and rates of hydration and dehydration of the peat with reference to water are therefore affected by its porosity and permeability.

The voids or pores within the material vary in size; this size distribution is of significance to the suitability of the peat as a rooting medium in the field. More particularly, the largest proportion of the water held by peat is located in relatively large pores and is termed "drainage" water. This water is free to move out of the peat into the surrounding soil should the soil be dry. It is conventional to describe the drainage water as that water which can be displaced from peat by pressures of 1/10 to 1/3 bar (i.e., 1.5 – 5 p.s.i.). A second portion of the water held by peat is termed "capillary—bound" water. This is water which cannot move into the surrounding soil but is available to be taken up by the plant. Capillary-bound water is conventionally described as the water which can be displaced from peat by pressures of 1/3 bar to 15 bar (i.e., 5 p.s.i. to 225 p.s.i.). The remaining water within peat is termed "hygroscopic" water. It is retained in the tiniest capillaries with a tension greater than the osmotic pressure which can be exerted by the root system.

The water capacity of peat and the state of the capillaries are deleteriously affected by the processing to which the material is usually subjected. Since peat is usually wet in its natural state, it is conventional to kiln dry it to about 40 – 50 percent retained moisture. Kiln-drying irreversibly collapses a number of the capillaries and thus reduces the volume of water which the peat can hold in the capillary-bound condition.

In the course of the work on this invention, we have come to recognize that several features are desirable in the peat plug used in a plant container. It should, of course, contribute toward achieving a reasonable rate of growth of the seedling in the greenhouse. In this connection, the plug should be of ample size and capable of providing a suitable reservoir of water and water soluble nutrients, to the plant. The peat should be sufficiently loose so that the plant roots can readily extend through it. When outplanted, the plug should function as a reservoir and also have particular characteristics which aid the plant to survive. In this connection, the plug should be capable of rapid hydration and slow dehydration so that it will accumulate moisture from the soil when it is available but will conserve its own water when the soil is dry. It should also have a relatively large capillary-bound water capacity; this retained water helps to tide the plant over during periods of drought. Since the plug must be handled during planting, it should have enough mechanical strength to hold together during this operation.

The outer container should also have several attributes. Firstly, it should incorporate an "air-pruning" opening to encourage the development of a thick system of roots during the greenhouse stage. It is known that roots wilt on contacting air; this fact is used to advantage in container practice by providing an air-pruning opening at the base of the container. when one root emerges through the opening and is pruned, another sprouts; in this manner, a thick growth of roots is developed. Secondly, the container should be removable or destructable at the time of planting. This permits maximum egress of the roots from the plug and provides the opportunity for the development of a system of roots extending both laterally and vertically into the soil. Secure anchoring is thereby achieved with the result that the plant can resist frost heaving. Also, the supply of nutrients to the plant is maximized during the critical period of field establishment. Thirdly, if the outer container is to be partially left on, it should be adapted to conform to the contours of the hole in which it is planted. The resulting friction fit is helpful in resisting frost heaving.

Turning now to the process of manufacture, it should be highly mechanized and automated. It would also be useful if the process conditions could be easily manipulated to control certain characteristics of the plug, such as the rates of hydration and dehydration and the capillary-bound water capacity. With such a process, the plug could be "tailored" to the particular soil conditions in which it is to be planted to improve plant survivability. Finally, it is desirable that the process use non-processed peat as feed; this would eliminate the destruction of capillary-bound water capacity which occurs during kiln drying.

SUMMARY OF THE INVENTION

It is therefore a general object of the invention to provide a peat plug which is adapted to give adequate performance, not only in the greenhouse, but also in the field.

It is another object to provide a peat plug having certain properties "built-in" or enlarged by manufacturing procedures to improve survivability of the seedling in the field.

It is another object to provide a mechanically strong peat plug having an improved rate of dehydration and an increased capillary-bound water capacity when compared with hand-packed peat plugs.

It is another object to provide a container unit having an impermeable outer container or casing which is easily removable or destructable at the time of planting.

It is another object to provide a unit whose outer container has a large air-pruning opening at its base.

It is another general object to provide a process for manufacturing seedling container units and plugs which is well suited to mechanization and automation, and which is controllable to produce units having predetermined properties.

It is another object to provide such a process wherein peat is the rooting medium, and the process conditions can be easily varied to control the properties of the plug-more particularly, the rates of hydration and dehydration and the capillary-bound water capacity.

It is another object to provide a process of this type which can use non-processed bog peat as feed.

In accordance with this invention, a rooting medium plug is provided which is adapted to promote desirable plant growth and survival both in the greenhouse and field stages. This is accomplished by controllably varying the size and spacing of the rooting medium particles during processing of the loose material into plugs. Preferably, the rooting material is entirely peat or its major component is peat. The medium is mixed with water to form a paste-like material which is continuously compressed and forced through a die into plug form; variation of the water content is utilized as the chief means for controlling the extent of compaction and comminution. The extruded product is simultaneously encased in a thin, flexible, tubular casing of cylindrical or other form. Preferably the casing is made of plastic film. This casing functions as a root and moisture barrier in the greenhouse but it is easily removed or rendered inoperative, as by slitting, puncturing or perforating, at the time of planting. The encased product is divided, as by slicing it transversly, to provide seedling container units.

The development is characterized by several advantages, some of which are as follows:

1. The process is adapted to controllably vary the density of the peat in a simple manner. This variation is reflected in changes in particle size and spacing. Provided that these changes are kept within certain limits (expressed in terms of density), the changes have a beneficial effect on the rates of hydration and dehydration of the peat. In addition, more peat is packed into a unit volume than would be the case, for example, with hand-packed peat. The total moisture content and the capillary-bound water capacity of the plug are thereby additionally increased, with an attendant improvement in the amount of moisture available to the plant during dry periods. An optimized plug product, tailored to meet the soil and climate conditions of the field area in which it is to be planted, is thereby produced by means of adjustment of the plug density.

2. The improved plug is combined with an outer casing which is partially or completely removable. When outplanted, the bared plug's side and bottom surfaces are in direct contact with the soil. Good moisture transmittal to the plug, the development of a lateral root system from the plug into the soil, and fitting together of the contours of plug and soil are therefore obtained. This leads to improved growth and survivability.

3. The process is adapted to be practiced as a continuous operation and can be highly automated and mechanized. This results in reduced costs and increased production rates.

BRIEF DESCRIPTION OF THE DRAWING

In the drawings:

FIG. 7 is a perspective view of the container product.

DESCRIPTION OF THE PREFERRED EMBODIMENT

Rooting Medium

Figure 1:
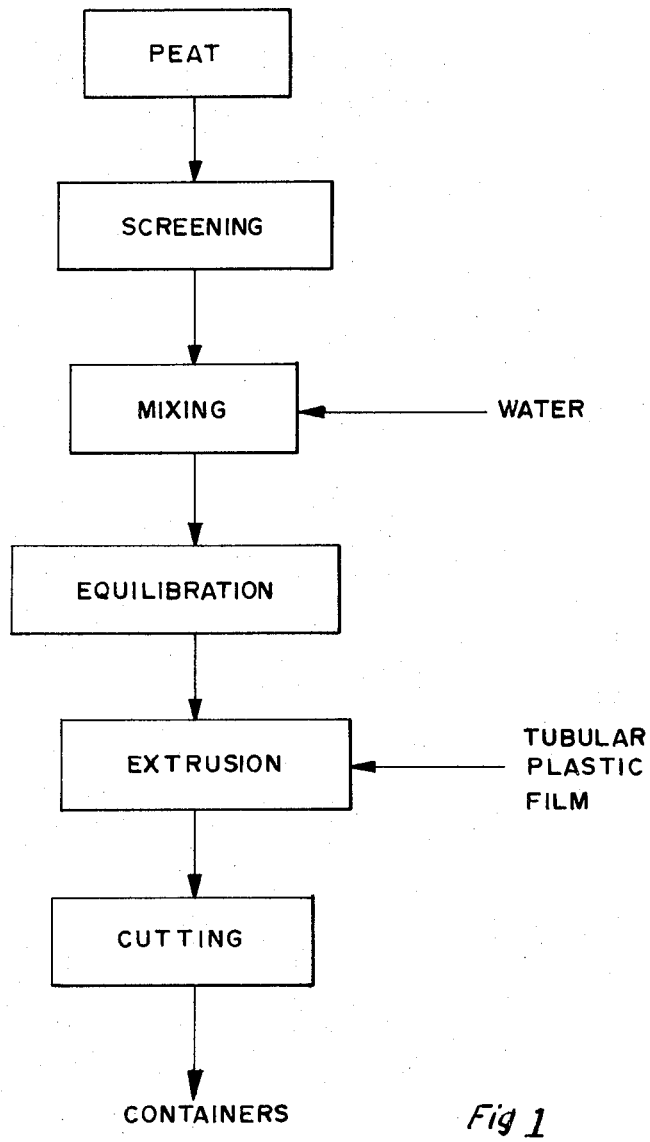
FIG. 1 is a block diagram showing the steps of the process.

The container plug is formed of an extrudable, water-absorptive and retentive material in which plant roots will grow. Preferably, this material comprises peat or a mixture in which peat is the major component. Examples of the latter are bark-peat and vermiculite-sand-peat. However the scope of the invention is also intended to extend to artifical rooting mediums, such as porous and permeable plastic foams.

One suitable peat is produced at Moss Spur, Manitoba, and is sold by Western Moss Ltd. It has the following properties:

Von Post rank — 1
pH — 3.9
% nitrogen — 0.90
% moisture — 41
% ash — 5.4
soluble ionic salts — 135 micromhos/cm. at 25° C
water absorptive value— 730 gms. $H_2O$/100 gms. dry peat
1/10 bar moisture — 387 gms. $H_2O$/100 gms. dry peat
⅓ bar moisture — 244 gms. $H_2O$/100 gms. dry peat
15 bar moisture — 130 gms. $H_2O$/100 gms. dry peat Fluid content of the paste The addition of water or an equivalent agent to the rooting medium prior to extrusion provides one suitable means for controlling the density (dry weight/wet volume) of the plug product. The water functions as a diluent and lubricant. It fills some of the voids within the peat and thus limits the extent to which these voids are closed during the compression stage of the process. Its lubricating quality aids the peat particles to move past each other during compression with the result that the large voids are partially filled in with fine particles. Additionally, the use of water allows the peat to move through the extruder parts with reduced friction and comminution.

When using extrusion apparatus, such as that described below, the water addition to the peat must vary between about 70 and 85 percent of the weight of the mixture. If the paste fed to the extrusion operation contains less than 70 percent water, the plug product is too dense to support any reasonable degree of seedling growth and it is very difficult to process the peat as it tends to block the extruder. This is probably due to excessive attrition of the peat. If more than 85 percent water is used, the paste is too fluid for extrusion. There is considerable drainage, with the result that water backs up into the feed section of the apparatus making the operation very difficult. In addition, the product plug is weak and tends to slump.

We prefer to use a water addition of 70 – 85 percent. At this consistency, the paste is adapted to extrude easily when a compression ratio of 2:1 or 3:1 is used; yet the range of density of the end product is sufficiently broad to cover most of the desirable specifications. The range of 70 – 85 percent water addition leads to the production of plugs having dry weight/wet volume densities between about 0.25 and 0.13.

Screening

The peat is passed through a 1/2 inch screen to remove rocks, twigs and the like.

Mixing

The peat is then mixed with water to form a viscous, paste-like mass. To illustrate this step, the materials are mixed for 35 minutes in a model 2030 Marion mixer operating at 10 rpm. After mixing in this manner, the paste is allowed to equilibrate for about 30 minutes and is then extruded.

Extrusion and division

Following equilibration, the mass of paste is subjected to an extrusion operation wherein it is compressed and forced through a die into a thin-walled, tubular plastic casing.

Figure 2:
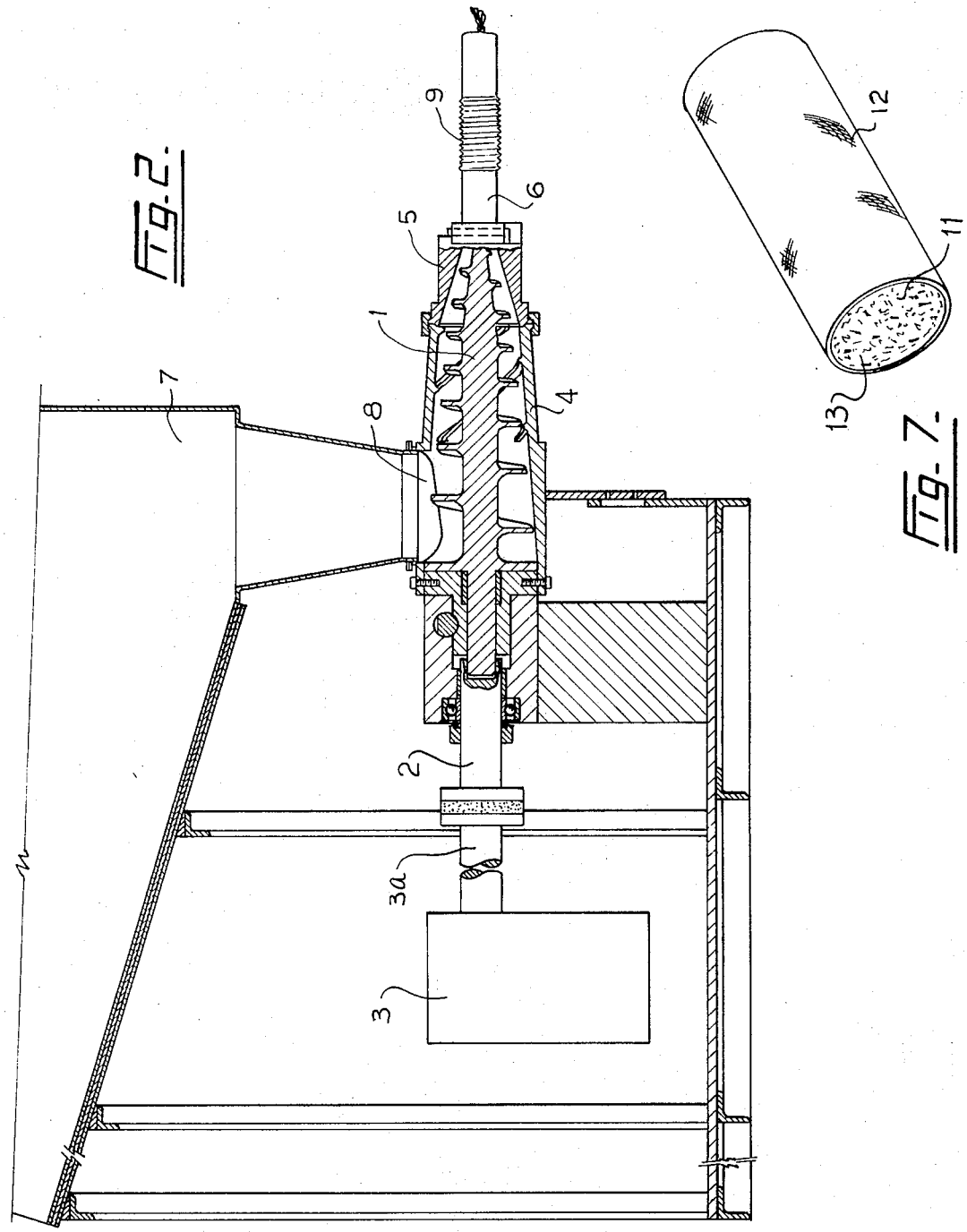
FIG. 2 is a sectional side view of an extruder apparatus which is used in the process.

In FIG. 2, an extrusion apparatus is shown which is suitable for practicing this invention. The extruder screw 1 is driven by a shaft 2 coupled to the drive shaft 3a of a 3 horse power motor 3 having an output speed range of 90 – 900 r.p.m. The extruder housing 4 is tapered and has a rifled internal surface coated with chromium. The lead of the screw flights is varied from the feed throat 8 to the head 5 to provide a compression ratio of 2:1. A demountable extrusion nozzle 6 (8 X 1 inches O.D.) is fitted to the head 5. The nozzle and head are coated internally with a low friction film, such as Teflon (trade mark). A hopper 7 feeds paste into the extruder feed throat 8.

A 15 foot long, 1 mil thick, 1 inch O.D. polythene casing 9 is threaded onto the nozzle 6. As the plug is extruded, it fills the casing 9 and forms a long container. The operator helps feed paste to the screw 1 with one hand and holds a slight tension on the casing 9 with his other hand. The long container is sliced with a gang cutter (not shown) into short lengths which are packed in trays or the like.

The product

With reference to FIG. 7, the product is a cylindrical container unit comprising an inner body or plug 11 and outer casing 12. Usually the product is about 1 inch in diameter and has a length of about 3 inches. The plug is a coherent mass having sufficient mechanical strength to remain intact during normal handling. It is uniformly dense and has a density between 0.13 and 0.25. gm/cc It is characterized by improved rates of hydration and dehydration and capillary-bound water content when compared with the hand-packed plugs of the prior art. Preferably, the plug is formed of peat and it is free of agents, such as cellulose or binders, which might be deleterious to plant growth (these materials tend to promote the production of unwanted bacteria). The plastic casing 12 is thin, flexible, impermeable to water and cylindrical in form. It provides a relatively large air-pruning opening 13 at its base. The casing is easily removable since it can be slit end to end and peeled off. Alternatively, the casing is destructable in the sense that it can be perforated to provide for lateral egress of the roots. When left on, its flexibility permits a good friction fit with the sides of the hole in which the container unit is planted.

The invention and its advantages will be more clearly understood by the following examples:

The invention and its advantages will be more clearly understood by the following examples:

EXAMPLE I

To illustrate the role played by water content in controlling the density of the product plug, a number of runs, using the equipment described above and the conditions of Example VIII, were carried out using peat and varying amounts of water. Table II sets out the pertinent data:

TABLE II

| Run. No. | %H2O | Drive Speed (rpm) | Extrusion rate (ft./min) | Density of plug (dry wt./wet vol.) |
|---|---|---|---|---|
| 5 | 74.3 | 400 | 19.1 | .245 |
| 1 | 79.5 | 450 | 25.3 | .212 |
| 11 | 82.07 | 740 | 40.0 | .182 |
| 25 | 84.18 | 250 | 12.6 | .165 |

Figure 3:
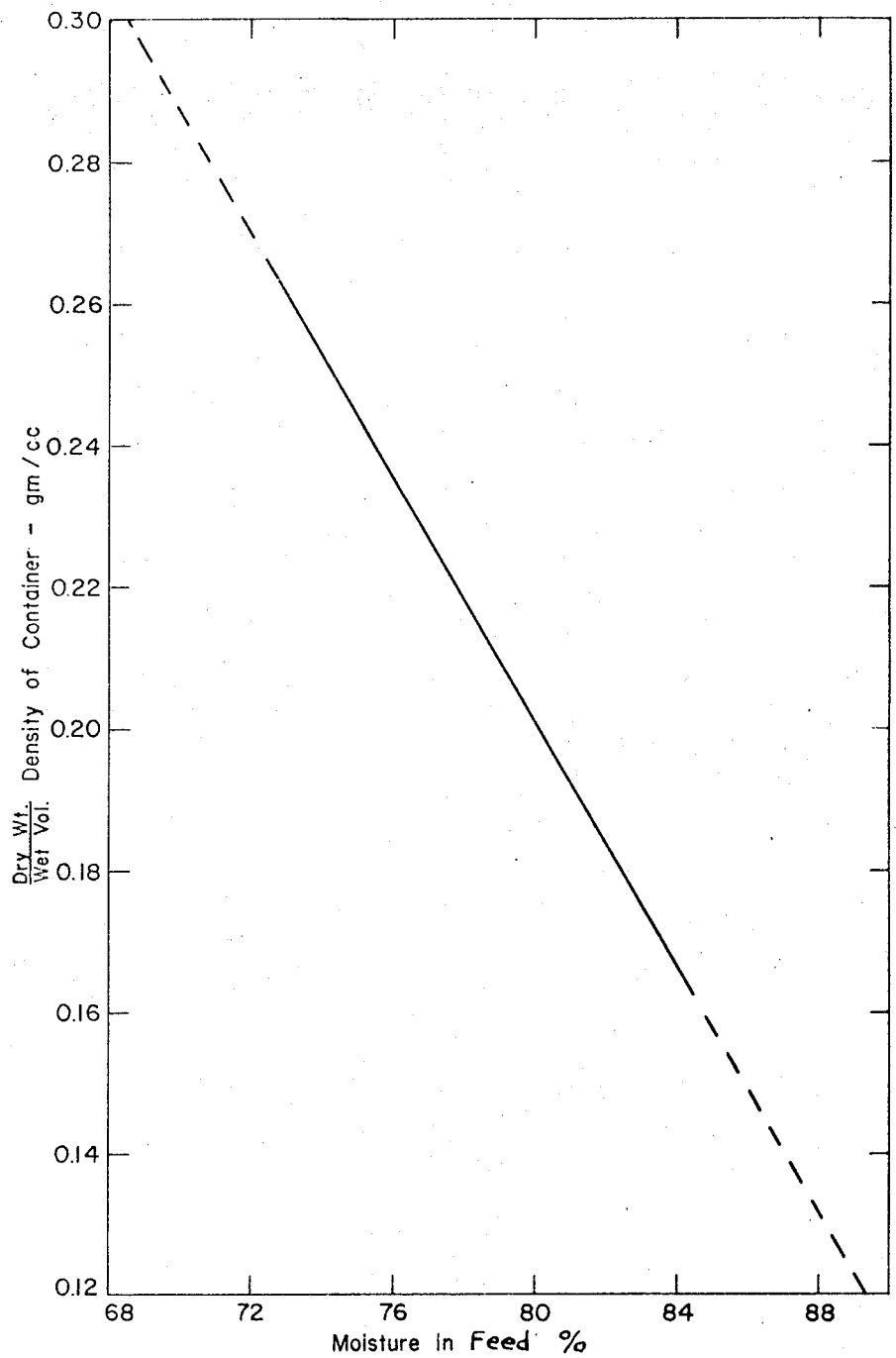
FIG. 3 is a graph in which the moisture content of the feed is plotted against the density of the plug product.

FIG. 3 illustrates the linear relationship which exists between plug density and variation of water content in the feed.

EXAMPLE II

This example illustrates the proposition that a plug formed of extruded peat rehydrates faster than one formed of non-extruded peat.

A series of containers, having the following specifications were prepared from Moss Spur peat:

TABLE III

| Plug No. | Process of Manufacture | Density (dry wt./wet vol.) | Size and type casing |
|---|---|---|---|
| Series 1 | hand-packed with non-extruded peat | .09 | 1" O.D., rigid plastic tube |
| Series 2 | hand-packed with extruded peat | .10 | 1" O.D., rigid plastic tube |
| Series 3 | extruded into film casing | .16 | 1" O.D., plastic film casing |
| Series 4 | extruded into film casing | .19 | 1" O.D., plastic film casing |
| Series 5 | extruded into film casing | .22 | 1" O.D., plastic film casing |

Figure 4:
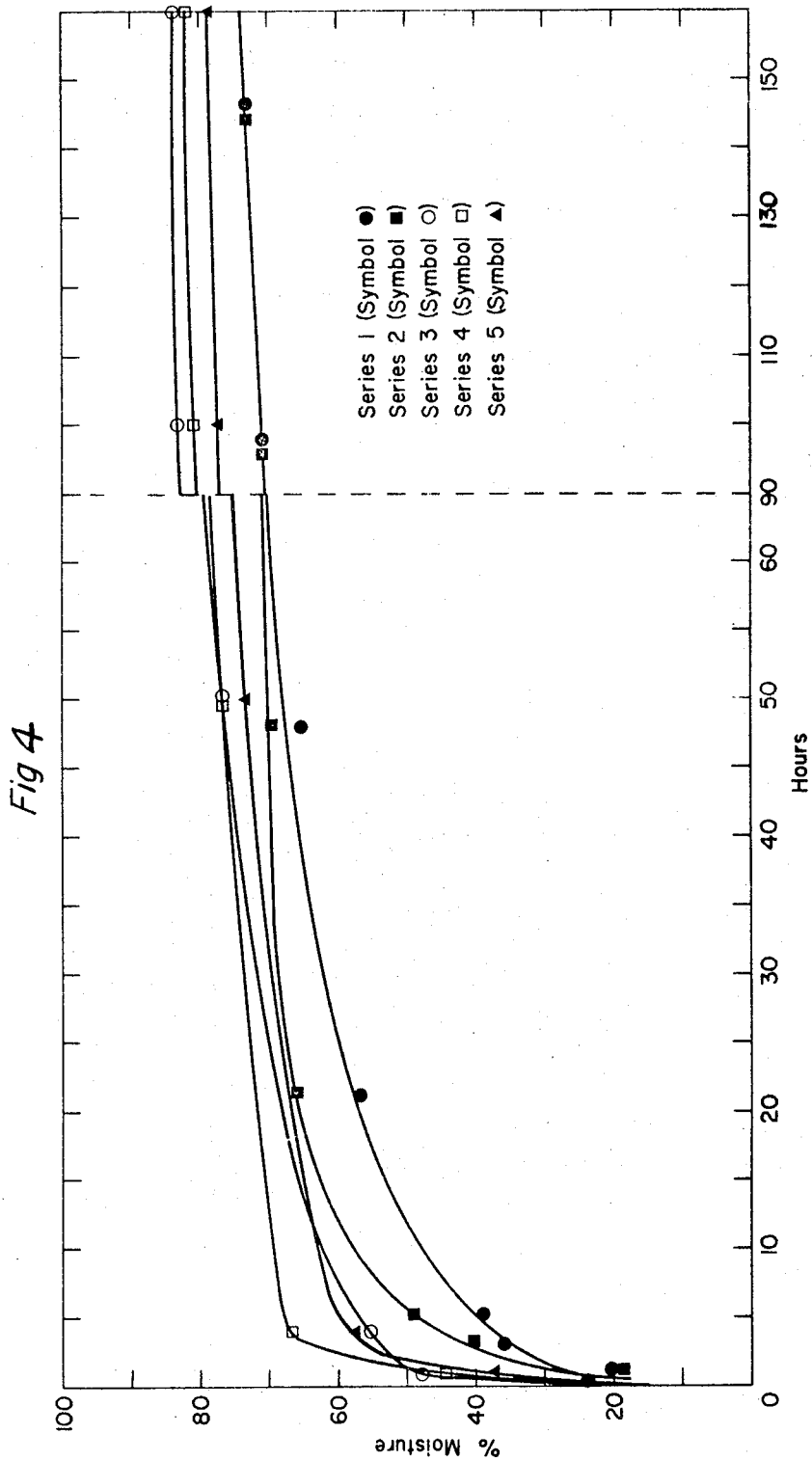
FIG. 4 is a graph in which the effect of density of the plug on its rehydration rate is shown by plotting moisture content of the plug against time.

The containers were air-dried to 5 percent moisture and placed on a water-saturated sand horizon. As shown in FIG. 4, the non-extruded, hand-packed plugs of Series 1 required about 12 hours to reach 50 percent moisture content whereas the extruded, hand-packed plugs of Series 2 took about 6 hours to achieve the same result.

As further shown in FIG. 4, the extruded, dense plugs of Series 3, 4 and 5 only required about 2 hours each to rehydrate to the 50 percent level. The variations in density of the plugs in accordance with the invention had little effect on rehydration rate.

EXAMPLE III

This example illustrates the improvement to be gained in rehydration rate when the container casing is removed.

Figure 5:
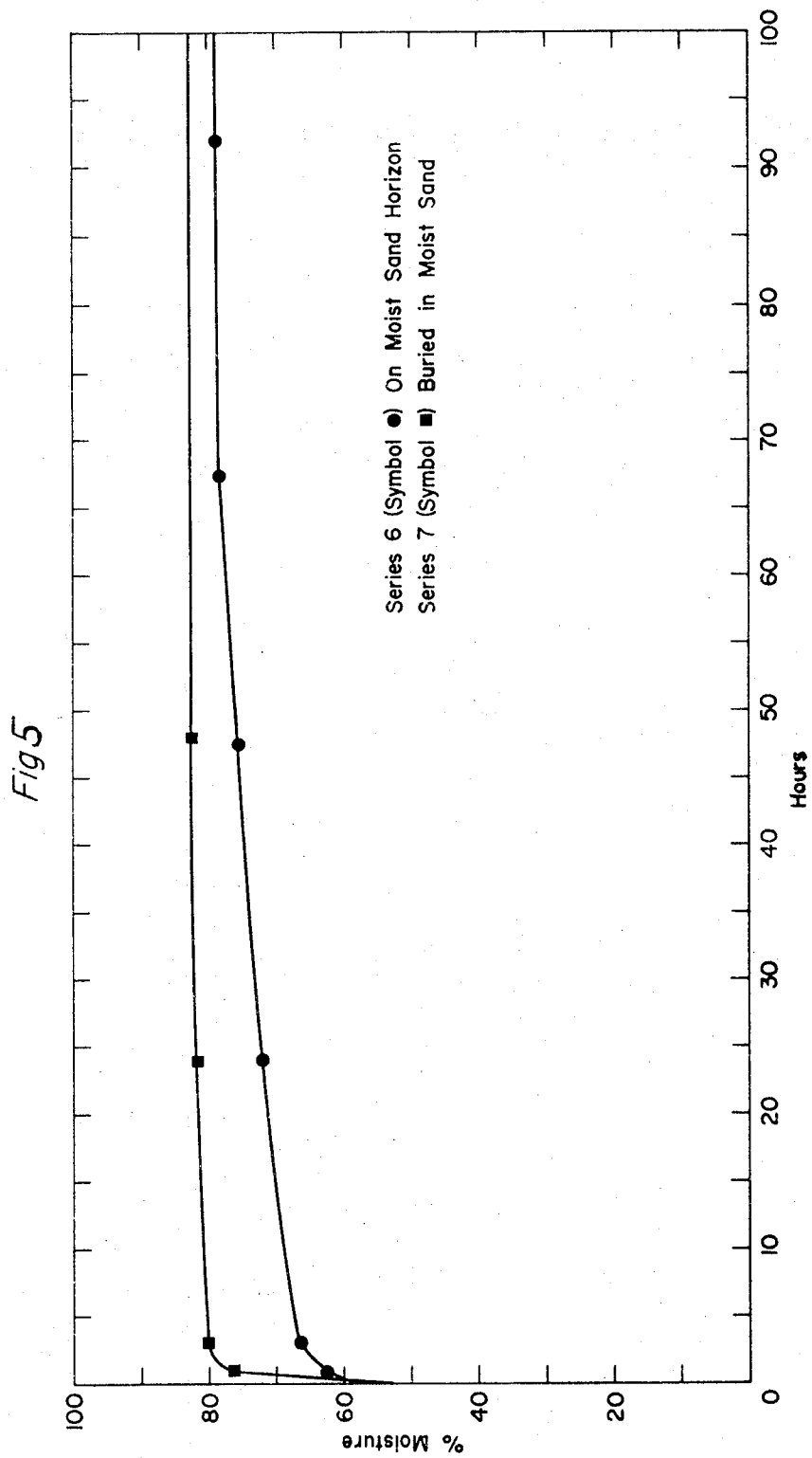
FIG. 5 is a graph in which the effect of outer container removal on rehydration rate is shown by plotting moisture content of plugs against time.

Two extruded containers were prepared, each having a density of 0.15 and dried to 15 bar moisture content. The casing was left on one plug and it was placed on a moist sand horizon so that moisture could only be absorbed through the bottom cross-sectional opening. The casing was removed from a second plug and it was buried in a saturated sand horizon so that moisture could be absorbed through the sides and bottom surfaces. FIG. 5 shows the rate of rehydration of the two plugs; the bared plug reached a moisture content of 80 percent within an hour whereas the other plug required 2 hours to reach 65 percent moisture and never passed above the 75 percent level.

EXAMPLE IV

This example illustrates the improvement obtained in dehydration rate when the plug is extruded.

A series of 1 × 3 inches plugs were prepared as follows:

TABLE IV

| Plug No. | Process | Density |
|---|---|---|
| Series 8 | hand-packed, non extruded | .10 |
| Series 9 | hand-packed, extruded | .10 |
| Series 10 | extruded | .156 |
| Series 11 | double extruded | .185 |

Figure 6:
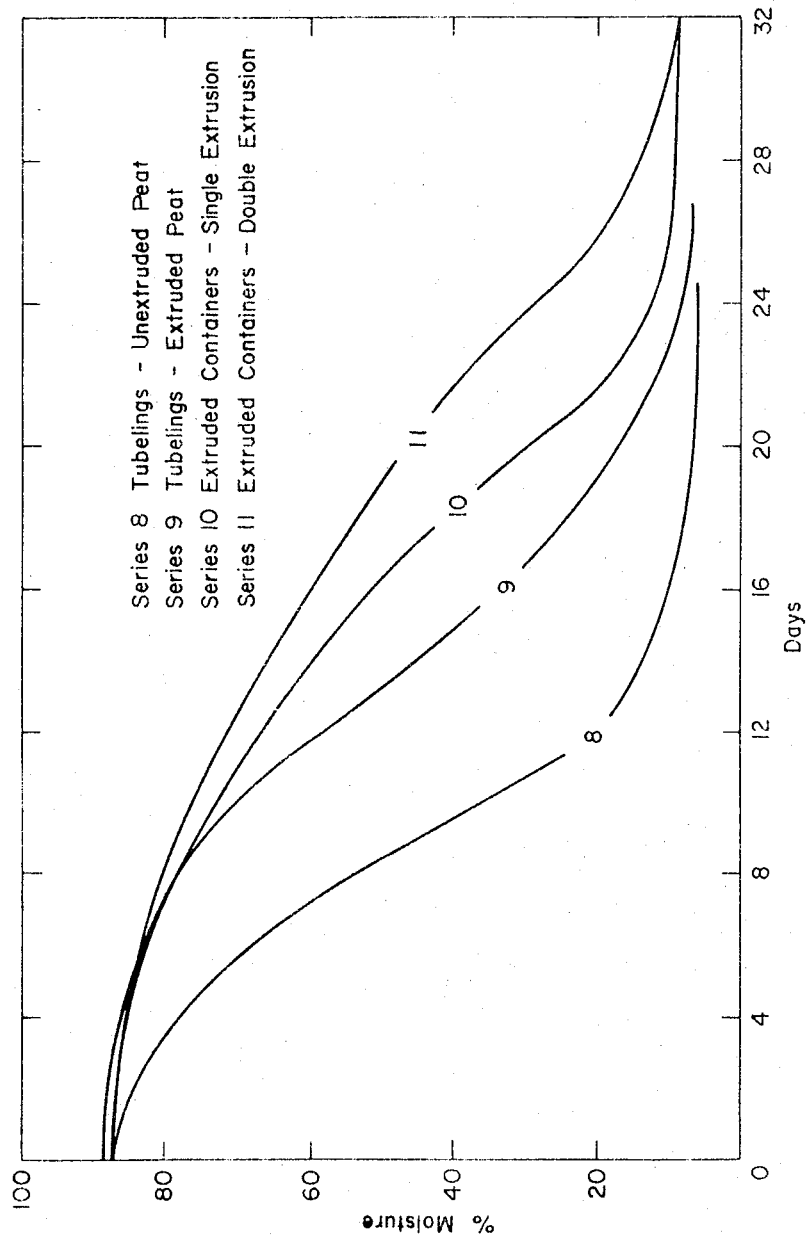
FIG. 6 is a graph in which the effects on dehydration of extrusion and density variation are shown by plotting moisture content of plugs against time.

The plugs were each saturated with water and then allowed to dry in air. A clear trend showing retardation in dehydration rate with increasing density was observed when the results were plotted to give FIG. 6.

EXAMPLE V

A number of lodgepole pine seedlings were raised under controlled greenhouse conditions in containers having both extruded and non-extruded plugs of different densities. The following growth data was obtained:

TABLE V

| | | Seedling dry weight (milli grams) | | |
|---|---|---|---|---|
| Plug | Plug Density | After 8 weeks | After 10 weeks | After 12 weeks |
| Series 12 | .095 (non-extruded) | 57.0 | 80.7 | 114.6 |
| Series 13 | .110 (non-extruded) | 74.1 | 87.7 | 99.8 |
| Series 14 | .156 (extruded) | 45.6 | 84.4 | 109.1 |
| Series 15 | .185 (extruded) | 41.5 | 64.9 | 68.9 |
| Series 16 | .224 (extruded) | 35.5 | 42.6 | 52.9 |

From this data, it is seen that the extruded plug of low density (0.156) provided as good growth as the hand-packed plugs. The seedlings in the dense (0.185 and 0.224) plugs were not able to grow as quickly as their counterparts in the porous plugs; however a reasonable rate of steady growth was still obtained.

EXAMPLE VI

This example illustrates the seedlings planted in extruded plugs generally have better growth under droughting conditions than do seedlings planted in containers hand-packed with loose-fill medium. Lodgepole pine seedlings were grown in the two container types as described in Example V. At week 12, the seedlings grown in the loose-fill plastic tubes were transplanted directly into a 6 inches thick soil horizon with the tube intact; the seedlings grown in the extruded containers had the plastic wall covering stripped off prior to planting. The five treatments were planted in blocks of four seedlings per flat at 4 inches spacings. Twelve replicate flats were set up in the greenhouse and their orientation and position in the greenhouse was randomized to minimize variation in the greenhouse. The soil horizon was saturated with water for two days, then the watering regime was completely withdrawn for 10 weeks in order to simulate droughting conditions. Seedlings were examined on alternate days and the day wilting commenced was recorded. Wilting was a qualitative subjective assessment of the seedling condition which evaluated the change in needle color, lustre, droop, and stiffness. When 50 percent of a treatment had wilted, the number of days from the beginning of drought was recorded. After 10 weeks of drought, the soil was saturated with water for several days and the final mortality assessed. The blocks were washed out and the seedling weight increases and percentage weight increases from week 12 were recorded for both the surviving and the dead seedlings.

cantly larger in favor of the extruded containers of lowest densities. It was concluded that growth continued for a longer period of time in the case of the extruded containers 14P and 15P and the onset of mortality was significantly postponed. This interpretation is in accordance with the peat moisture relationships derived above for compressed extruded cylinders.

EXAMPLE VII

This example illustrates the improved survivability and resistance to frost heaving of seedlings field planted in extruded plugs when compared with seedlings field planted in hand-packed tubes. Two types of containers were tested: (a) 1 inch × 3 inches extruded containers of the type produced in Example VIII and (b) ¾ × 3 inches rigid wall tubes hand-packed with loose-fill peat. Both types were seeded to lodgepole pine, white spruce, and Douglas fir. They were field planted when the seedlings were approximately 20 weeks old, in a cut-over site, known for its serious frost heaving characteristics that had been prepared by scarifying. In this trial, the plastic skins of the extruded containers (a) were perforated in many places prior to planting. The rigid wall tube was planted with and without the tube intact. The tubelings were evaluated for survival, growth and were scored as frost heaved if the container or TABLE VI
(Container type and seedling growth during drought) [1]

| Series | 12 | 13 | 14P [2] | 15P [2] | 16P [2] | |
|---|---|---|---|---|---|---|
| Container type | Hand packed tube | Hand packed tube | Extruded plug (E.P.) | E.P. | E.P. | Comparison t-statistic |
| Density | (0.095) | (0.110) | (0.156) | (0.185) | (0.224) | |
| Absolute wt. increase (mg) — surviving seedlings. | [3] 115.2 | 106.9 | 103.6 | 153.8 | 124.8 | $t_{(12\ 14p)}$0.53, n.s. $t_{(12\ 15p)}$1.57, n.s. $t_{(13\ 14p)}$0.14, n.s. $t_{(13\ 15p)}$1.76, n.s. |
| Percent wt. increase — surviving seedlings. | 100 | 107 | 128 | 210 | 162 | $t_{(12\ 14p)}$0.77, n.s. $t_{(12\ 15p)}$1.86* $t_{(13\ 14p)}$0.52, n.s. $t_{(13\ 15p)}$2.03* |
| Absolute wt. increase (mg) — dead seedlings. | 32.4 | 71.4 | 95.8 | 99.1 | 55.0 | $t_{(12\ 14p)}$5.04*** $t_{(12\ 15p)}$6.47*** $t_{(13\ 14p)}$1.75* $t_{(13\ 15p)}$2.31** |
| Percent wt. increase — dead seedlings. | 28 | 71 | 118 | 135 | 71 | $t_{(12\ 14p)}$4.52*** $t_{(12\ 15p)}$4.43*** $t_{(13\ 14p)}$2.05* $t_{(13\ 15p)}$2.47** |

[1] Droughting period for seedlings planted in soil horizon: Weeks 12–22 (Day 72 of drought).
[2] Series 14P, 15P, 16P: P denotes plastic skin was removed and stock planted as an extruded plug plus seedling.
[3] t-Statistics tested for comparison of means at the following levels of probability: n.s. — no significant difference; * — 90% probability;  — 95% probability; * — 99+% probability.

Table VI describes the growth of both the surviving seedlings and the dead seedlings when tested in the two container types; (a) rooting medium hand-packed into a plastic tube, and (b) the compressed peat extruded plugs, with wall film removed. Although treatments 3 and 4 gave larger average values in the case of the surviving seedlings, application of the T-statistical test used to compare treatments demonstrated that these differences could not be classed as significantly different. The T-test was insensitive because the populations of surviving seedlings in the various treatments was small. In the case of the dead seedlings, the same statistical tests clearly indicated that growth was significontents heaved ¼ inch or more from the original planting depth.

The results of Table VII show that survival is better in the 1 inch extruded container (over 90 percent) compared to the ¾ inch tubes, whether the rigid tube is removed or not, and growth appears to be superior. Several factors are probably responsible for this effect, such as media volume and peat-moisture relationships discussed above. The effect of the flexible, perforated container wall or plug is also clearly indicated in the decreased incidence of frost heaving in comparison to the rigid wall container. This effect is attributed to the provision of greater opportunity of early root anchorage.

EXAMPLE VIII

This example illustrates one suitable method for practicing the invention. One bale of horticultural peat (6 cu ft., 104 lbs.) of 48 percent moisture content was blended for 30 minutes with approximately 189 lbs. of water in a 30 cu ft. paddle mixer which had a blade speed of 20 rpm. The mixture, having a uniform moisture content of 81.45 percent, was discharged and transferred to the hopper of a custom-built extruder, in accordance with FIG. 7. The mixture was extruded through a screw auger of compression ratio 2:1, turning at 600 rpm, and through a 1 × 8 inches outlet nozzle, into a 1 inch diameter tubular polythene film of 1 mil thickness at the front end. Lengths of 15 – 20 feet of film had been threaded onto the nozzles which had been equipped with a bayonet-type mount for rapid exchange. A set of 10 nozzles was employed in a rotational loading and filling sequence. Extrusion rates of 35 – 40 feet/minute were attained under these conditions. The lengths of filled container were collected on a rotating turntable platform.

The lengths of filled container were cut into 3 inch sections using a gang cutter equipped with 10 hollow-ground circular knives rotating at 600 rpm and set at 3 inch spacings. Randomly-selected containers were weighed in grams and their diameters and lengths measured in centimeters. The dry weight/wet volume density was 0.182g/cc with a coefficient of variation of 5 percent or less. The cut sections were packed in trays (98 containers per tray). Seed depressions (178 × ¼inch) were made by a high-speed air-driven drill and seeding of pine, spruce, or Douglas fir was conducted by a 98-nozzle vacuum seeder. Tray design permitted stacking and palletizing operations.

The seeded containers were transferred to a greenhouse where illumination, misting, temperature and humidity control, irrigation and nutrient addition were carried out according to established growth procedures, for periods up to 8 – 10 weeks, followed by at least an 8-week period outdoors to harden-off the seedlings.

Field planting consisted of selection of a desirable microsite, preferably on scarified soil, formation of a 1 × 3 inch hole either by using a dibble or a soil coring device. The thin plastic wall was either manually perforated or removed by slitting such that the plug of rooting medium and the plant are inserted into the hole.

EXAMPLE IX

This example further illustrates the improved survivability, growth and resistance to frost heaving of 18Week-old lodgepole pine seedlings field planted in extruded plugs as compared to field planted 18-week-old seedlings grown in loose-fill hand-packed, rigid plastic tubes of equal rooting volume. The site was a level field of rich TABLE VII
(Survival and Comparison Data—August 1969 Planting—Rocky Mountain Plot)

| | Survival | | | 1970 season's growth* | | | | | | | Frost heaved | | |
|---|---|---|---|---|---|---|---|---|---|---|---|---|---|
| | No. counted | Percent survival | Percent mortality | No. counted | Percent ¼" | Percent ½" | Percent 1" | Percent 1.5" | Percent 2" | Percent 3" | Percent heaved | Percent alive | Percent dead |
| 1" Extruded container: | | | | | | | | | | | | | |
| Lodgepole Pine | 50 | 94 | 6 | 44 | | 9 | 66 | | 18 | 7 | 6 | 0 | 3 |
| White Spruce | 24 | 92 | 8 | 22 | | 45 | 55 | | | | 21 | 3 | 2 |
| Douglas Fir | 5 | 20 | 80 | | | | | | | | 20 | | 1 |
| ¾" Tubeling: | | | | | | | | | | | | | |
| Lodgepole Pine: | | | | | | | | | | | | | |
| Tube removed | 87 | 61 | 39 | 54 | 4 | 56 | 28 | 7 | 5 | | 29 | 7 | 18 |
| Tube intact | 93 | 61 | 39 | 55 | 27 | 47 | 20 | 5 | | | 96 | 53 | 36 |
| White Spruce: | | | | | | | | | | | | | |
| Tube removed | 79 | 63 | 37 | 48 | 19 | 35 | 29 | 10 | 2 | 4 | 19 | 8 | 7 |
| Tube intact | 77 | 59 | 41 | 45 | 31 | 35 | 27 | 4 | 2 | | 90 | 41 | 28 |

TABLE VIII
(Survival and Growth of Lodgepole Pine Seedlings)

| Container: | Compressed cylinder | | | | | | Loose fill hand pack |
|---|---|---|---|---|---|---|---|
| Density: | 0.142 | | 0.187 | | 0.206 | | 0.110 |
| Wall treatment: | Polythene skin slit or removed | Encased in rigid tube | Polythene skin slit or removed | Encased in rigid tube | Polythene skin slit or removed | Encased in rigid tube | Rigid tube |
| Series: | 17 | 18 | 19 | 20 | 21 | 22 | 23 |
| No. planted, July 1970 | 58 | 59 | 58 | 50 | 29 | 28 | 18 |
| Planting mortality, Fall 1970 (%) | 5.7 | 8.5 | 9.0 | 10.2 | 17.2 | 3.6 | 27.8 |
| Winter mortality, Spring 1971 (%) | 3.7 | 5.6 | 4.3 | 11.3 | 0 | 3.7 | 23 |
| Cumulative mortality, Spring 1971 (%) | 9.4 | 13.6 | 22.4 | 20.3 | 17.2 | 7.1 | 44.4 |
| Cumulative survival,* Spring 1971 (%) | 90.6 | 86.4 | 77.6 | 79.7 | 82.8 | 92.9 | 55.6 |
| Mean seedling height (cm)† | 7.8 | 6.2 | 8.0 | 6.2 | 8.6 | 8.5 | 4.0 |
| Frost heaved (%) | 2 | 40 | 2 | 28 | 0 | 7 | 0 |
| Average height of heaved container (cm) | 2.5 | 1.7 | 2.5 | 2.4 | 0 | 1.6 | 0 |

*$z_{(17\ 23)}-2.84$ (*); $z_{(18\ 23)}-2.45$ (*); $z_{(19\ 23)}-1.70$ (*); $z_{(20\ 23)}-1.85$ (*); $z_{(21\ 23)}-1.99$ (); $z_{(22\ 23)}-2.94$ (*).
†$t_{(17\ 23)}-7.20$ (*); $t_{(19\ 23)}-7.56$ (*); $t_{(21\ 23)}-8.60$ (***).

black loam, free of weeds and competitive vegetation. The 1 inch diameter extruded containers were planted at 4 foot spacings with either the polythene skin removed or slit longitudinally in at least four equal spacings around the circumference. After the mid-summer planting, the site received minimal rainfall for the remainder of the summer and fall; it received approximately 80 inches of snowfall during the winter. A number of treatments were tested to illustrate the effect of compressing the peat into cylinders and also to test the effect of encasing the rooting medium in a rigid wall, and also to compare densities of rooting medium The control containers consisted of low density, loose fill, hand-packed comminuted peat loaded into 1 inch diameter rigid wall tubes.

Table VIII clearly illustrates the superior survival and growth characteristics for seedlings grown in the compressed extruded plugs (Series 17, 18, 19, 20, 21 22), with or without a container wall, when compared to those grown in the loose-fill media of equal volume (Series 23). These effects are related to the peat-moisture relationships discussed above. The frost heaving effect which is aggravated by rigid wall container systems is clearly illustrated in the three pairs tested (Series 17–18, Series 19–20, Series 21–22).

EXAMPLE X

This example illustrates the use of peat-loam mixture to grow vegetables and flowers. Systems containing horticulture peat and rich black loam, by volume, were blended and adjusted to the water contents described in Table IX. Fifty containers of each series were seeded to tomato, leaf lettuce, head lettuce, marigold and aster. The containers were grown under a fluorescent lamp source of 800 ft-candles and 16 hour photo period for 8 weeks. Satisfactory seedlings were obtained in Series 23, 24, 25, 26, 27, 28. The acidic medium of Series 29, 30, and 31 produced undersized plants.

The embodiments of the invention in which an exclusive property or privilege is claimed are defined as follows:

1. A seedling container unit comprising:
a coherant, solid, extruded, cylindrical body consisting essentially of compressed, comminuted peat, having a Von Post decomposition rank of about 1–3, and water, provided in an amount between 70 percent and 85 percent by weight of the body at the time of extrusion, said body having flat ends, the curved surface of said body being encased by a thin, impermeable, flexible, plastic film, the top and bottom end faces of the body being unencased, said body further having a substantially uniform dry weight/wet volume density throughout its length and width, said density being between about 0.13 gms/cc and 0.25 gms/cc, said body having a seed or seedling planted in a flat end face thereof.

2. A process for producing seedling container units useful for rearing seedlings comprising:
mixing loose peat with water in an amount between 70 percent and 85 percent by weight of the mixture and in the absence of any binder to form an extrudable mixture;
compressing and comminuting the peat in the mixture by extruding the mixture to form a continuous, coherant, cylindrical body of peat having a uniform dry weight/wet volume density of between 0.13 gms/cc and 0.25 gms/cc;
encasing the cylindrical body in a thin, flexible, impermeable casing; and
slicing the encased body transversely to its longitudinal axis to form a plurality of container units.

TABLE IX

| Series | Peat Soil (vol:vol) | % Feed Moisture | Accpetable Plant Response at Wk.8 |
|---|---|---|---|
| 23 | 4 : 1 | 59 | yes |
| 24 | 4 : 1 | 60 | yes |
| 25 | 4 : 1 | 62 | yes |
| 26 | 9 : 1 | 66 | yes |
| 27 | 9 : 1 | 69 | yes |
| 28 | 9 : 1 | 73 | yes |
| 29 | 19 : 1 | 65 | no |
| 30 | 19 : 1 | 69 | no |
| 31 | 19 : 1 | 74 | no |

* * * * *